(12) United States Patent
Lou et al.

(10) Patent No.: US 9,667,650 B2
(45) Date of Patent: May 30, 2017

(54) ANTI-REPLAY CHECKING WITH MULTIPLE SEQUENCE NUMBER SPACES

(71) Applicant: Cisco Technology, Inc., San Jose, CA (US)

(72) Inventors: Shuxian Lou, San Jose, CA (US); Jie Chu, Los Altos, CA (US); Michael Fingleton, Sunnyvale, CA (US); Hsia R. Yu, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 14/713,588

(22) Filed: May 15, 2015

(65) Prior Publication Data

US 2016/0337398 A1 Nov. 17, 2016

(51) Int. Cl.
*H04L 29/06* (2006.01)

(52) U.S. Cl.
CPC ...... *H04L 63/1466* (2013.01); *H04L 63/0272* (2013.01); *H04L 63/164* (2013.01)

(58) Field of Classification Search
CPC ... H04L 69/16; H04L 69/161; H04L 63/0485; H04L 63/145
USPC ......................................................... 726/14
See application file for complete search history.

(56) References Cited

U.S. PATENT DOCUMENTS

| | | | |
|---|---|---|---|
| 7,571,343 B1 | 8/2009 | Xiang et al. | |
| 8,191,133 B2 * | 5/2012 | Khanna | H04L 63/1466 726/12 |
| 8,646,090 B1 | 2/2014 | Gadde et al. | |
| 2007/0115812 A1 | 5/2007 | Hughes | |
| 2008/0205385 A1 * | 8/2008 | Zeng | H04L 45/00 370/389 |
| 2010/0161750 A1 * | 6/2010 | Pandya | H04L 29/06 709/212 |
| 2010/0278045 A1 * | 11/2010 | Xiang | H04L 47/2408 370/235 |
| 2012/0174216 A1 | 7/2012 | Vukovic et al. | |
| 2015/0033014 A1 | 1/2015 | McGrew et al. | |

OTHER PUBLICATIONS

Zhang, Yongguang, and Bikramjit Singh. "A Multi-Layer IPSEC Protocol." USENIX Security Symposium. vol. 9. 2000.*

(Continued)

*Primary Examiner* — Syed Zaidi
(74) *Attorney, Agent, or Firm* — Edell, Shapiro & Finnan, LLC

(57) ABSTRACT

Processes and systems to create a plurality of sequence number spaces in a security association at a transmission device. Each sequence number space corresponds to a respective class of traffic. Each sequence number space is identified by a unique selector value. For each sequence number space, a sequence number counter is created for counting a sequence of outbound packets of a class of traffic corresponding to the sequence number space. For an outbound packet of a particular class of traffic, a selector value of a sequence number space of the particular class of traffic is written into a first portion of a sequence number field in the outbound packet. Low-order bits of the current value of a sequence number counter, associated with the sequence number space of the particular class of traffic, is written into a second portion of the sequence number field. The sequence number counter is then incremented.

20 Claims, 8 Drawing Sheets

(56) References Cited

OTHER PUBLICATIONS

Malik, Ritu, and Rupali Syal. "Performance analysis of ip security vpn." International Journal of Computer Applications 8.4 (2010): 0975.*
Shiraishi, Yoshiaki, Youji Fukuta, and Masakatu Morii. "A security protocol intended to ease QoS management in IP networks." Electronics and Communications in Japan (Part II: Electronics) 87.2 (2004): 47-58.*
Völker, Lars, Marcus Schöller, and Martina Zitterbart. "Introducing QoS mechanisms into the IPsec packet processing." Local Computer Networks, 2007. LCN 2007. 32nd IEEE Conference on. IEEE, 2007.*
RFC 4302 (Dec. 2005).*
RFC 4594 (Aug. 2006).*
McGrew, et al. "The security and performance of the Galois/Counter Mode (GCM) of operation." Progress in Cryptology—INDOCRYPT 2004. Springer Berlin Heidelberg, 2005. pp. 343-355.
McGrew, et al., "The security of the extended codebook (XCB) mode of operation." Selected Areas in Cryptography, Springer, Berlin, Heidelberg, Aug. 2007, 17 pages.
McGrew, et al., "An Interface and Algorithms for Authenticated Encryption," Network Working Group, Standards Track, Request for Comments: 5116, Jan. 2008, pp. 1-23.
Dworkin, "Recommendation for Block Cipher Modes of Operation: The CCM Mode for Authentication and Confidentiality," NIST Special Publication 800-38C, May 2004, 27 pages.
Dworkin, "Recommendation for Block Cipher Modes of Operation: Galois/Counter Mode (GCM) and GMAC," NIST Special Publication 800-38D, Nov. 2007, 39 pages.
Huang et al., "An Anti-Replay Window Protocol with Controlled Shift", Computer Communications and Networks, Proceedings of 10th International Conference, Oct. 2001, pp. 242-247.
Zhao et al., "Analysis and Improvement of IPSec Anti-Replay Window Protocol", Computer Communications and Networks, ICCN 2003, Proceedings of the 12th International Conference, Oct. 2003, pp. 553-558.
Kent et al., "Security Architecture for the Internet Protocol", Network Working Group, Category: Standards Track, Request for Comments: 4301, Dec. 2005, 101 pages.
Kent, "IP Authentication Header", Network Working Group, Category: Standards Track, Request for Comments: 4302, Dec. 2005, 34 pages.
Kent, "IP Encapsulating Security Payload (ESP)", Network Working Group, Category: Standards Track, Request for Comments: 4303, Dec. 2005, 38 pages.
Extended European Search Report, in European Application No. 14178240.9, mailed Jan. 22, 2015, 7 pages.

* cited by examiner

| PACKET | CLASS (PRIORITY) | SELECTOR VALUE | COUNTER VALUE | SEQUENCE NO. FIELD (HEX) |
|---|---|---|---|---|
| 1 | NORMAL | 0 | 1 | 00000001 |
| 2 | NORMAL | 0 | 2 | 00000002 |
| 3 | HIGH | 1 | 1 | 80000001 |
| 4 | NORMAL | 0 | 3 | 00000003 |
| 5 | HIGH | 1 | 2 | 80000002 |
| 6 | NORMAL | 0 | 4 | 00000004 |

FIG.8

| PACKET | CLASS | SELECTOR VALUE | COUNTER VALUE | SEQUENCE NO. FIELD (HEX) |
|---|---|---|---|---|
| 1 | C | 2 | 1 | 20000001 |
| 2 | C | 2 | 2 | 20000002 |
| 3 | A | 0 | 1 | 00000001 |
| 4 | B | 1 | 1 | 10000001 |
| 5 | M | 12 | 1 | C0000001 |
| 6 | B | 1 | 2 | 10000002 |
| 7 | C | 2 | 3 | 20000003 |
| 8 | C | 2 | 4 | 20000004 |
| 9 | A | 0 | 2 | 00000002 |
| 10 | A | 0 | 3 | 00000003 |
| 11 | B | 1 | 3 | 10000003 |

FIG.9

ANTI-REPLAY CHECKING WITH MULTIPLE SEQUENCE NUMBER SPACES

TECHNICAL FIELD

The present disclosure relates to information assurance in data networks.

BACKGROUND

In some network attacks, a hacker may try to capture and re-send old or duplicated packets to a receiving device. Such activity may be used to spoof a receiving device. Network security protocols such as the Internet Protocol Security (IPSec) standard provide an anti-replay protection service in which the receiving device will drop old or duplicated packets to protect itself from such attacks. To implement this protection, packet headers may be used where each header includes a sequence number. The sequence number is incremented with each packet. If the receiver receives a packet with an unexpected sequence number (e.g., one that suggests a duplicated packet), then the packet may represent a spoofing attempt, and is discarded. In the context of the IPSec protocol, the header may be an encapsulating security payload (ESP) header or an authentication header (AH).

Specifically, the anti-replay protection works by using a sequence number in the sender's security association (SA) and a sliding window or range of acceptable sequence numbers at the receiving device. On the sender side, whenever an IP packet needs to be protected by an outbound SA, the sequence number in the SA is incremented and placed in the sequence number field in the ESP (or AH) header. On the receiver side, the sequence number is extracted from the ESP (or AH) header, and checked against the range of acceptable sequence numbers in the sliding window to see if the packet is old (i.e., outside the range) or duplicated. The packet is dropped if either is true. Such a scheme may be used in any situation where packets are subject to reordering in transit. Generally, in IP networks, packets are not guaranteed to be delivered in the same sequence in which they were sent initially. The sliding window at a receiving device is a mechanism that accommodates some amount of reordering within an SA flow. The reordering may take place as a result of natural traffic routing. The reordering may also take place as a result of systemic features such as traffic engineering, performance routing, and/or the implementation of service classes related to quality of service (QoS), for example.

BRIEF DESCRIPTION OF THE DRAWINGS

FIG. 8 illustrates an example of data used to create a sequence number having both a sequence number counter value and a selector value, according to an example embodiment.

FIG. 9 illustrates a further example of data used to create a sequence number, according to an example embodiment.

DESCRIPTION OF EXAMPLE EMBODIMENTS

Overview

In an embodiment, a process and system are provided to create a plurality of sequence number spaces for a security association at a transmission device. Each sequence number space corresponds to a respective class of traffic. Each sequence number space is identified by a unique selector value. For each sequence number space, a sequence number counter is created for counting a sequence of outbound packets of a class of traffic corresponding to the sequence number space. For an outbound packet of a particular class of traffic, a selector value of a sequence number space of the particular class of traffic is written into a first portion of a sequence number field in a header of the outbound packet. The low order bits of a current value of a sequence number counter, associated with the sequence number space of the particular class of traffic, are written into a second portion of the sequence number field. The sequence number counter is then incremented.

Example Embodiments

Problems can arise when a security protocol such as IPSec is used in conjunction with a quality of service (QoS) scheme such as the Differentiated Services model. In a system that uses the Differentiated Services model, application traffic traversing the network may be grouped into different classes based on traffic characteristics and performance requirements of those applications. One such scheme is documented in RFC 4594 (published by the Internet Engineering Task Force), for example. Although packets from several service classes may be protected in a single SA, each class' packets may be queued separately, per class, on network elements along a traffic path. As a result, a given packet may be delivered so far out of order that it falls outside the anti-replay window. In this case, when the packets arrive at the receiver, the receiving device's sliding window may have advanced too far to accommodate the out-of-sequence packets. Therefore the packets may be considered old and may therefore be dropped, though these packets are actually valid. In this situation, the anti-replay protection mechanism may drop packets that are legitimate.

Figure 1:
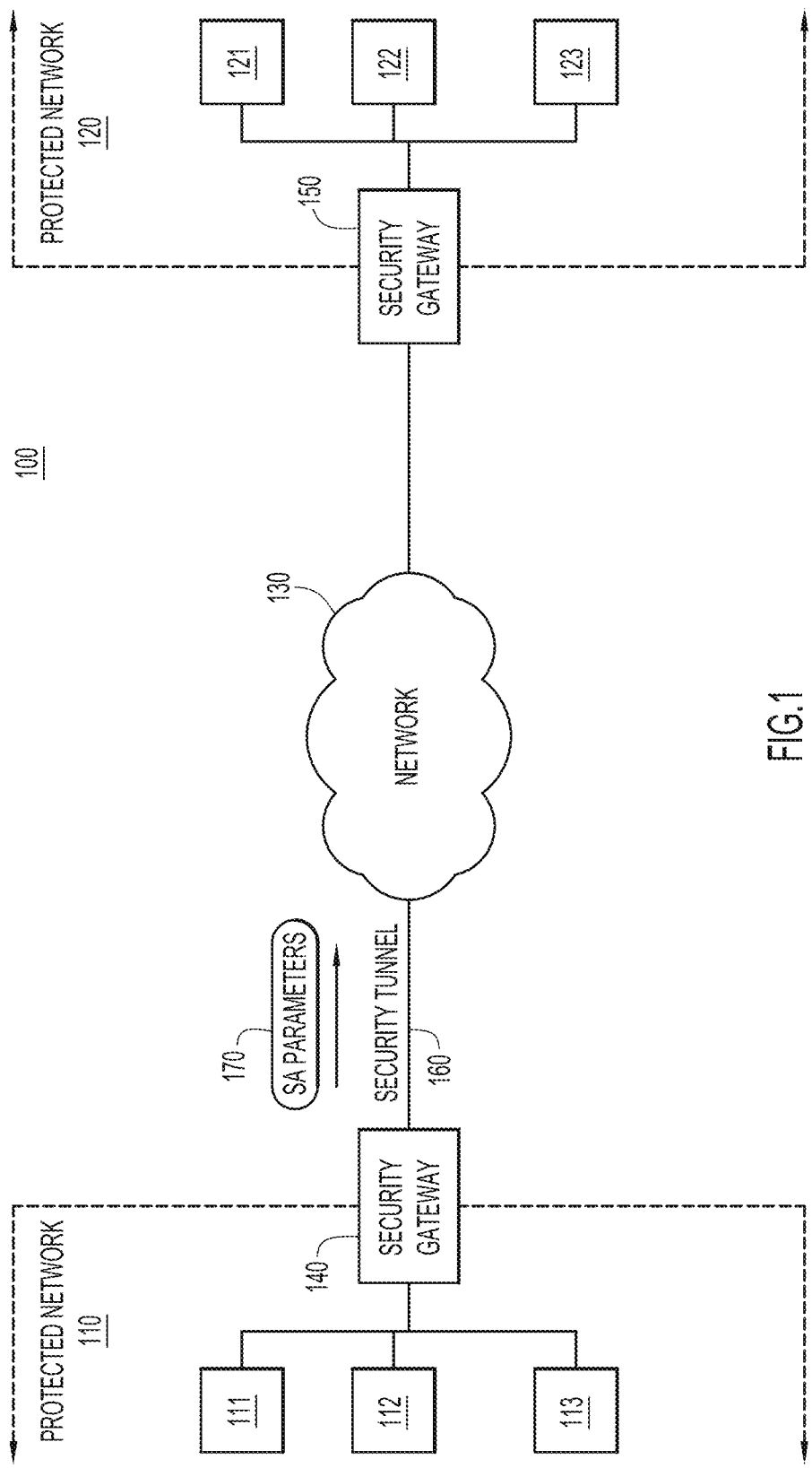
FIG. 1 is a block diagram illustrating a system that implements an embodiment of the processing described herein.

FIG. 1 illustrates a communications system that connects two protected networks 110 and 120. The protected network 110 includes a set of connected nodes 111-113. These nodes may include client devices, servers, or other processing and communications devices. Communications from any of these nodes to a node in another protected network, such as protected network 120, pass through security gateway 140. At security gateway 140, one or more security associations (SAs) are established and maintained. A given SA includes security parameters 170 that are sent to protected network 120. This allows the implementation of security measures for communications channels between any of the nodes 111-113 in protected network 110 and any of the nodes 121-123 in protected network 120. With a common set of security parameters at each of the security gateways 140 and 150, compatible security measures may be implemented. In the illustrated embodiment, this results in a security tunnel 160 that connects protected network 110 and protected network 120. The security tunnel 160 may pass through an otherwise unsecured network 130, such as the Internet.

Figure 2:
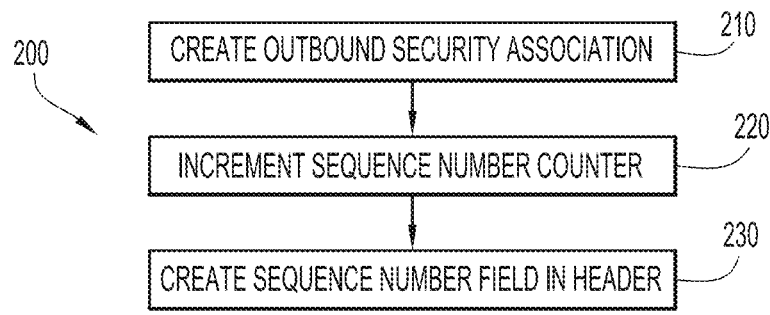
FIG. 2 is a flowchart illustrating implementation of anti-replay measures, according to an example embodiment.

FIG. 2 illustrates the processing performed at an outbound network element having security functionality, such as security gateway 140, according to an embodiment. At 210, a security association is created for outbound traffic. A given system or device (such as a security gateway) may have one or more SAs. At 220, a sequence number counter is incremented. At 230, a sequence number field in the header of an outgoing packet is created. The field contains the value of the sequence number counter, which increments with each packet through a space of sequence numbers that is assigned to the packet's class of traffic. Additional detail on these operations is provided below.

Figure 3:
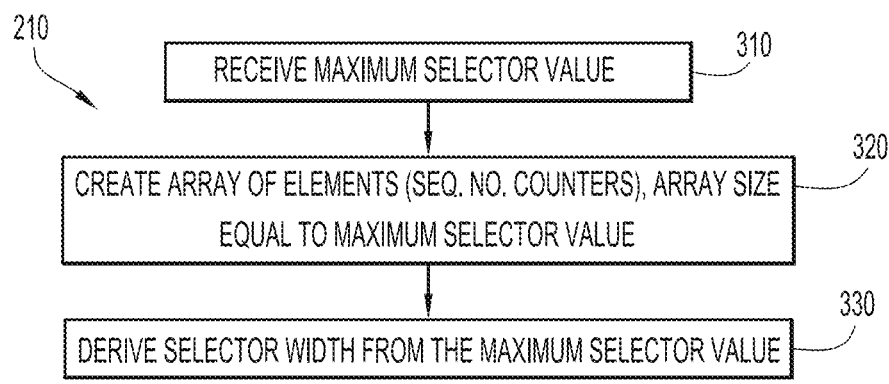
FIG. 3 is a flowchart illustrating the creation of an outbound security association, according to an example embodiment.

The creation of an outbound SA (reference 210 of FIG. 2), is illustrated in greater detail in FIG. 3, according to an embodiment. This may be performed at an outbound security gateway, for example. As noted above, a particular sequence number space corresponds to a particular class of traffic. Classes of traffic may be aligned with QoS defined service classes for example. Alternatively, classes of traffic may be defined by one or more alternative criteria. A sequence number space is indexed by a value that identifies the sequence number space. This value is referred to herein as a selector value. When configuring an SA, the number of classes of traffic can be determined, thereby determining the number of sequence number spaces. A given SA may therefore have multiple sequence number spaces and respective selector values. Assuming that the sequence number spaces are identified by respective selector values sequentially, there will be a maximum selector value. At 310, the maximum selector value is received. This value may be received from an administrator or process responsible for the security association. At 320, an array (or other data structure) of elements is created or allocated, where each element is a sequence number counter for a sequence number space. The size of the array (i.e., the number of elements in the array) is equal to the maximum selector value plus one. A binary representation of the maximum selector value will have a width that depends on the maximum selector value. At 330, this width, referred to herein as the selector width, is derived.

Figure 4:
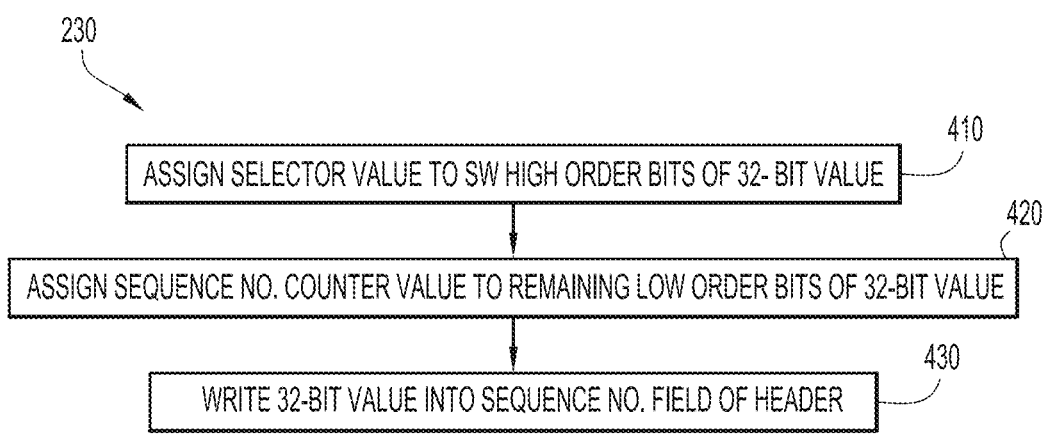
FIG. 4 is a flowchart illustrating the creation of a sequence number field in a packet header, according to an example embodiment.

Creation of a 32-bit sequence number field for a packet header (reference 230 of FIG. 2) is illustrated in greater detail in FIG. 4 according to an embodiment. The sequence number field contains two distinct values. The first represents the value of a sequence number counter operating within the sequence number space of the packet's class of traffic. Successive packets in a class of traffic will have successive sequence numbers in the sequence number space. In this sense, the packet's sequence number can be viewed as a counter value. At 410, the selector value is assigned to the high order bits of the 32-bit value. The number of bits required for the selector depends on the maximum necessary value for the selector value (i.e., the number of sequence number spaces for the SA). This number of bits is referred to herein as the selector width (SW). At 420, the sequence number counter value (or the lowest order bits thereof) is assigned to the low order bits of a 32-bit value, i.e., to the remaining low order bits that are available after the selector value is written to the high order bits. The space available for the sequence number counter is equal to 32-SW. At 430, the resulting 32-bit value is written into the sequence number field of the header. Note that in some circumstances the sequence number counter value may actually require more bits than 32-SW. In this event, only the lowest order 32-SW bits of the sequence number counter value are written to the sequence number field. The remaining higher order bits of the sequence number counter value are not transmitted, but can be reconstructed as necessary at the receiver. In an embodiment, this reconstruction may be done according to the algorithm specified in RFC 4303, Appendix A, published by the IETF.

Figure 5:
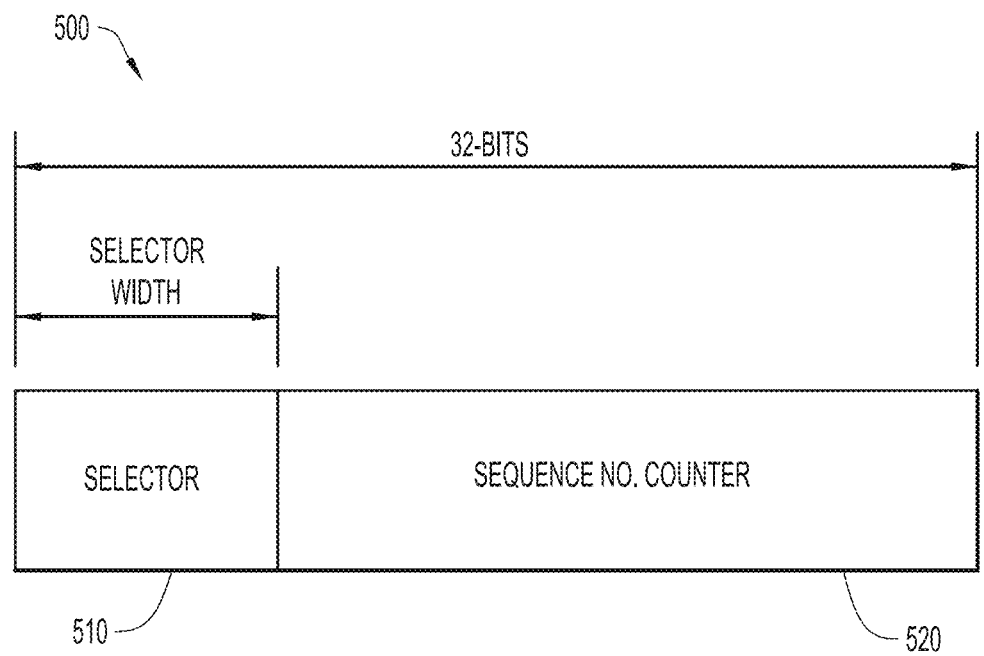
FIG. 5 illustrates a sequence number field, according to an example embodiment.

This is further illustrated in FIG. 5, according to an embodiment. A sequence number field 500 is shown, with a length of 32 bits. A selector value 510 is shown in the high order bits of the field. The number of bits allocated for the selector value 510 is equal to the selector width, as shown. A sequence number counter value 520 is shown in the lower order bits.

The 32-bit value described above and in FIGS. 4 and 5 is presented as an example. In other embodiments, the sequence number may be represented in a field of a different size, such as 64-bits. In such a case, the sequence number counter value may again be written into the low order bits of the field, and the selector value written into the high order bits of the field.

Figure 6:
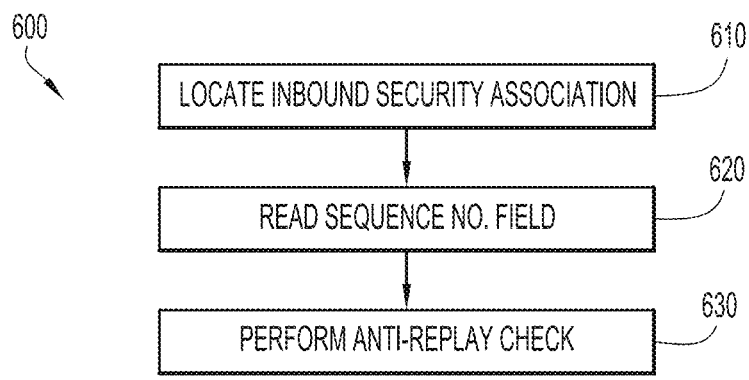
FIG. 6 illustrates processing at a network device that is receiving a packet, according to an example embodiment.

Processing at a security gateway that is to receive a packet (e.g., security gateway 150 of FIG. 1) is illustrated in FIG. 6, according to an embodiment. At 610, the security gateway locates the appropriate inbound security association. At 620, the sequence number field of the received packet is read. At 630, an anti-replay check is performed to determine how to treat the packet. If the sequence number is not within an acceptable range, for example, the packet may be part of a spoofing attack and may consequently be dropped.

Figure 7:
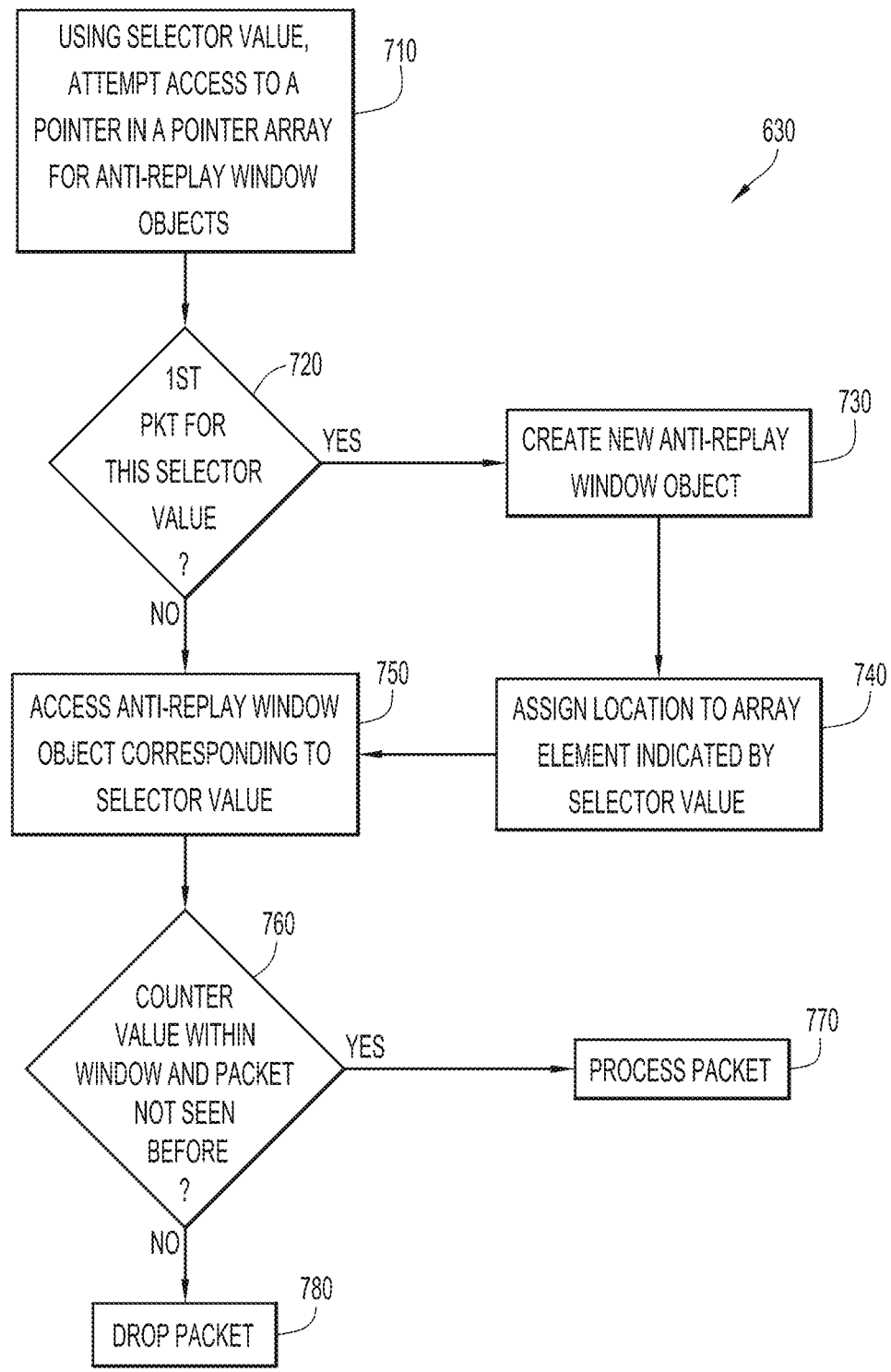
FIG. 7 illustrates an anti-replay check, according to an example embodiment.

An anti-replay check is illustrated in FIG. 7, according to an embodiment. In this embodiment, certain data items may be required at the receiving security gateway to allow the check to execute for packets of a given class of traffic. This data may include, for example, a size for an anti-replay window and a bitmap for such a window. Such data may be part of the SA and stored in a data structure at the receiving security gateway. In an object-oriented implementation, this data structure may be incorporated in an object (referred to herein as an anti-replay window object) for the class of traffic.

Moreover, because there may be multiple classes of traffic and corresponding multiple sequence number spaces for an SA, there may be multiple respective anti-replay windows. In the illustrated embodiment, anti-replay window objects are accessed through an array of respective pointers. At 710, the pointer for an anti-window replay object is accessed. The appropriate pointer is identified using the selector value in the header of the received packet, e.g., selector 510 shown in FIG. 5. A pointer may not be available, however, if the received packet is the first one received for a particular class of traffic and sequence number space. At 720, a determination is made as to whether the received packet is the first packet in the particular sequence number space identified by the selector value (as seen in the packet header). If so, then at 730 a new anti-replay window object is created for this selector value and sequence number space. At 740, the location of this newly created anti-replay window object is assigned to the element of the pointer array corresponding to the selector value.

At 750, the anti-replay window object corresponding to the selector value is accessed through the pointer array. At 760, a check is made as to whether the counter value in the packet header (e.g., value 520 of FIG. 5) is within the window in the anti-replay window object and has not been seen before. If either condition is false, then at 780 the packet may be dropped. Otherwise the packet can be processed normally at 770.

FIG. 8 illustrates data related to a set of packets sent from a security gateway according to an embodiment. The data pertains to six packets, identified in the "Packet" column as packets 1-6. The packets are of different classes of traffic, identified in the "Class" column by priority, either normal or high. Packets 1, 2, 4, and 6 are to be processed with normal priority, and packets 3 and 5 are to be processed with high priority.

Because there are two classes of traffic, there are two sequence number spaces with two respective counters. A particular sequence number space may be identified by the "Selector value" as indicated. The selector value may be either 0 or 1. Selector value 0 is associated with the normal priority packets; selector value 1 is associated with the high priority packets. Each normal priority packet is assigned a value from the counter associated with normal priority packets. The first normal priority packet is therefore assigned a counter value of 1, as shown in the column "Counter value". Similarly, the second normal priority packet is assigned the next value of the counter (2), the third normal priority packet (packet 4) is assigned the next value of the counter (3), and the fourth normal priority packet (packet 6) is assigned the next value of the counter (4). Each high priority packet is assigned a value from the other counter, i.e., the counter associated with high priority packets. The first high priority packet (packet 3) is therefore assigned a counter value of 1, as shown in the column "Counter value". Similarly, the second high priority packet (packet 5) is assigned the next value of the counter (2).

Each packet has a header containing a sequence number field, shown in the last column. The value in the sequence number field includes the selector value and the counter value for the packet, as shown in FIG. 5. As described above, in an embodiment, the lowest order bits of the counter value are written to the lower order bits of this field, and the selector value is written to the higher order bits. Because there are two possible classes of traffic in this example, there are two possible selector values. Therefore, one bit may be used to represent the selector value in the sequence number field, and the selector width is 1. If the sequence number field is 32 bits, the counter value may be written to the lower order 31 bits. For example, the sequence number field for packet 5 will have a high order bit of 1 (indicating a selector value of 1). The sequence number for this packet, as shown in the counter value and written to the lower order bits of the sequence number field, is 2. The resulting sequence number field contains a value of 80000002 (hexadecimal). In various embodiments, the sequence number field may be part of an ESP header or an AH header as examples and without limitation.

FIG. 9 illustrates another embodiment. Here, eleven packets are shown (numbered 1-11) from a number of classes of traffic. Each class may be associated with one or more differentiated services code points (DSCP) for example. Class A is associated with a sequence number space that has a selector value of 0. Class B is associated with a sequence number space that has a selector value of 1. Class C is associated with a sequence number space that has a selector value of 2. Class M is associated with a sequence number space that has a selector value of 12. As before, each class has an associated counter. The first packet of class A (packet 3) has a counter value of 1. The second packet in class A (packet 9) has a counter value of 2. The third packet in class A (packet 10) has a counter value of 3. Packets in other classes are likewise assigned counter values, starting at counter value 1 in each class.

Because the selector values can range from 0 to 12, four bits are used to represent each selector value. In the illustrated example, therefore, the selector width is four. The selector value may therefore be written to the highest order four bits of the sequence number field, and the counter value may be written to the lowest order 32−4=28 bits assuming that the sequence number field is 32 bits. As a result, packet 1, which has a selector value of 2 (0010 in binary) and a counter value of 1, will have 20000001 (hexadecimal) in the sequence number field of its header. In another example, packet 6 has a selector value of 1 and a counter value of 2. As a result, a value of 10000002 will be written in the sequence number field of the header for packet 6.

Figure 10:
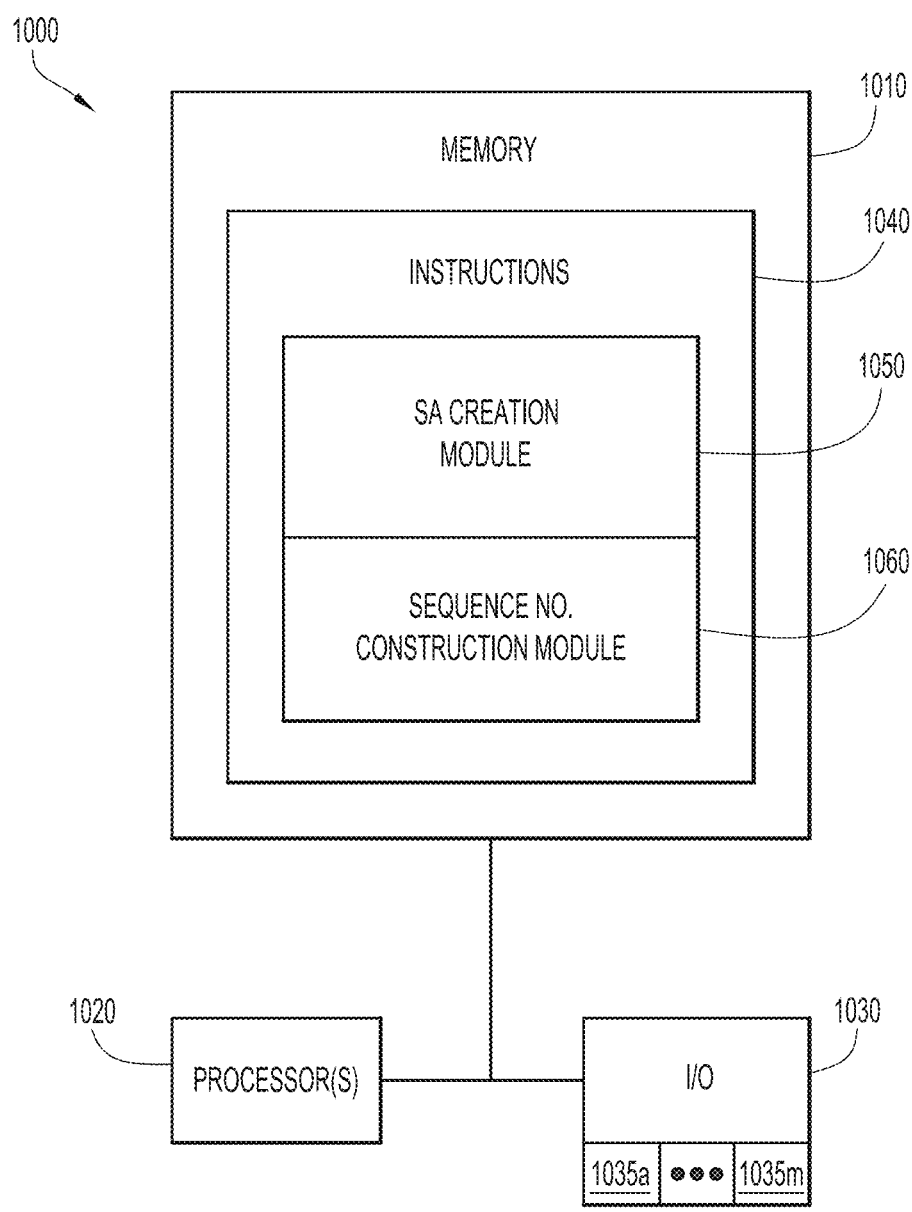
FIG. 10 illustrates a software or firmware embodiment of the processing described herein with respect to an outbound packet.

In an embodiment, the processing described above for processing of an outbound packet may be implemented in one or more programmable processors executing software or firmware (or a combination thereof). A software or firmware embodiment of these operations is illustrated in FIG. 10. A computing system 1000 includes one or more memory devices, shown collectively as memory 1010. Memory 1010 is in communication with one or more processors 1020 and with one or more input/output units 1030. An example of an I/O unit is a network processor unit that may have associated network ports or other communications ports 1035*a*-1035*m*. In an embodiment, I/O 1030 allows a user to interface with and control the execution of instructions 1040. I/O 1030 may also connect to other network components, such as a security gateway at a remote protected network. The I/O 1030 may include one or more Application Specific Integrated Circuits (ASICs) that are configured with digital logic gates to perform various networking and security functions. In an embodiment, the system 1000 may be embodied in any computing system or device. One example would be a security gateway such as gateway 140, where security-related processing for outbound packets may take place.

Memory 1010 may include, but is not limited to, read only memory (ROM), random access memory (RAM), magnetic disk storage media devices, optical storage media devices, flash memory devices, electrical, optical, or other physically tangible (i.e., non-transitory) memory storage devices. Memory 1010 stores data as well as executable instructions 1040. Instructions 1040 are executable on processor(s) 1020. The processor(s) 1020 comprise, for example, a microprocessor or microcontroller that executes instructions 1040. Thus, in general, the memory 1010 may comprise one or more tangible (non-transitory) computer readable storage media (e.g., memory device(s)) encoded with software or firmware that comprises computer executable instructions. When the instructions are executed (by the processor(s) 1020) the software or firmware is operable to perform the operations described herein.

In the illustrated embodiment, the executable instructions 1040 may include several logic modules. These include a security association creation module 1050, responsible for creation of an outbound SA as described, in an embodiment, in FIG. 3. Instructions 1040 may also include a sequence number creation module, responsible for creating a sequence number field that includes both a counter value and a selector value, as shown in FIG. 4, according to an embodiment.

Figure 11:
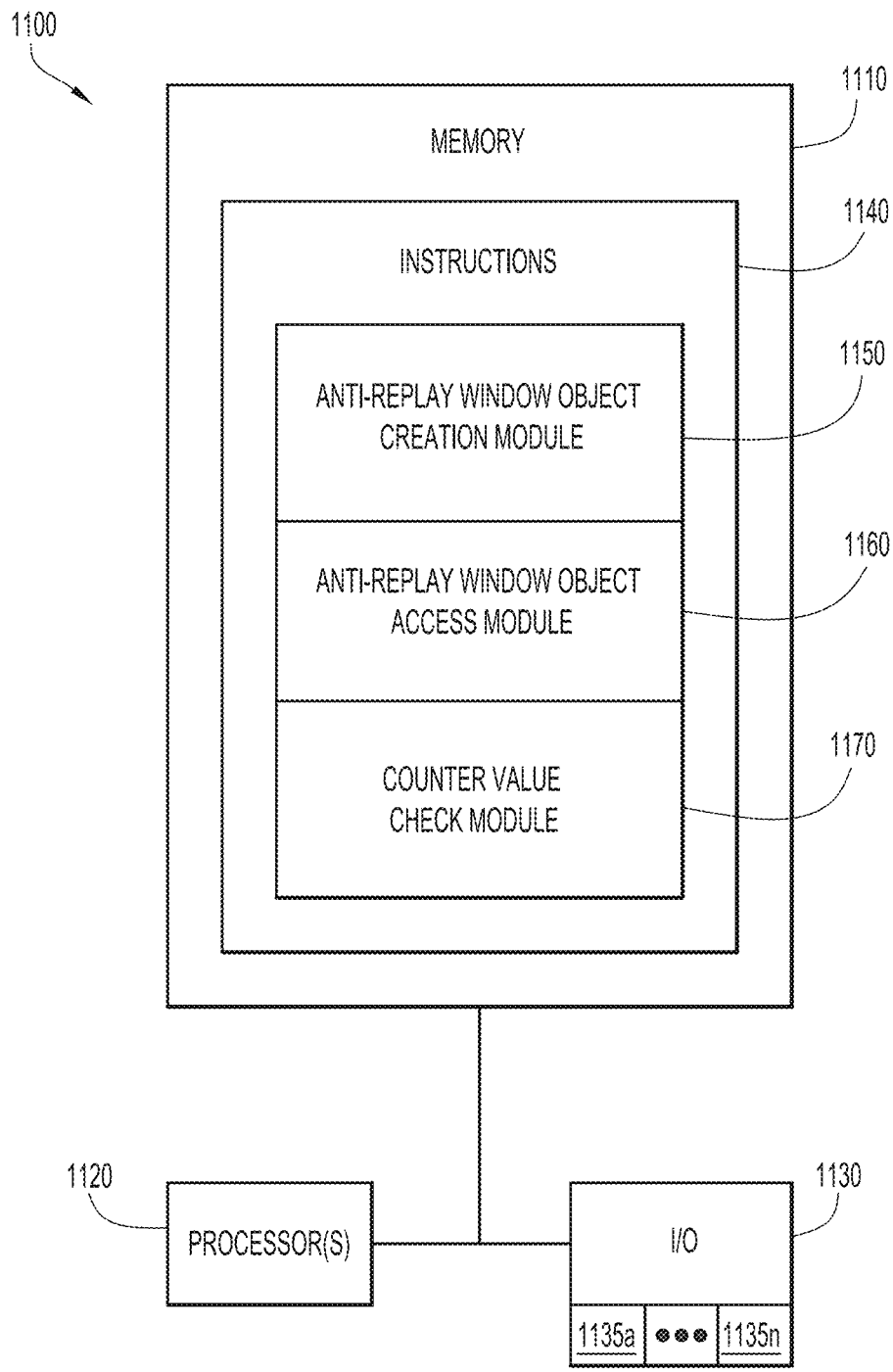
FIG. 11 illustrates a software or firmware embodiment of the processing described herein with respect to an incoming packet.

In an embodiment, the processing described above for processing of an inbound packet may be implemented in one or more programmable processors executing software or firmware (or a combination thereof). A software or firmware embodiment of these operations is illustrated in FIG. 11. A computing system 1100 includes one or more memory devices, shown collectively as memory 1110. Memory 1110 is in communication with one or more processors 1120 and with one or more input/output units 1130. An example of an I/O unit is a network processor unit that may have associated network ports or other communications ports 1135a-1135n. In an embodiment, I/O 1130 allows a user to interface with and control the execution of instructions 1140. I/O 1130 may also connect to other network components, such as a security gateway at a remote protected network. The I/O 1130 may include one or more ASICs that are configured with digital logic gates to perform various networking and security functions. In an embodiment, the system 1100 may be embodied in any computing system or device. One example would be a security gateway such as gateway 150, where security-related processing for inbound packets may take place.

Memory 1110 may include, but is not limited to, ROM, RAM, magnetic disk storage media devices, optical storage media devices, flash memory devices, electrical, optical, or other physically tangible (i.e., non-transitory) memory storage devices. Memory 1110 stores data as well as executable instructions 1140. Instructions 1140 are executable on processor(s) 1120. The processor(s) 1120 comprise, for example, a microprocessor or microcontroller that executes instructions 1140. Thus, in general, the memory 1110 may comprise one or more tangible (non-transitory) computer readable storage media (e.g., memory device(s)) encoded with software or firmware that comprises computer executable instructions. When the instructions are executed (by the processor(s) 1120) the software or firmware is operable to perform the operations described herein.

In the illustrated embodiment, the executable instructions 1140 may include several logic modules. These may include a module 1150 responsible for the creation of an anti-replay window object. A module 1160 may also be present, responsible for the access of an anti-replay window object. Module 1170 may be responsible for checking whether the counter value received in a packet's header is within the window specified in the appropriate anti-replay window object.

In one form embodiment, the process and system described herein create a plurality of sequence number spaces for a security association at a sending network device. Each sequence number space corresponds to a respective class of traffic. Each sequence number space is identified by a unique selector value. For each sequence number space, a sequence number counter is created for counting a sequence of outbound packets of a class of traffic corresponding to the sequence number space. For an outbound packet of a particular class of traffic, a selector value of a sequence number space of the particular class of traffic is written into a first portion of a sequence number field in a header of the outbound packet. The low order bits of a current value of a sequence number counter, associated with the sequence number space of the particular class of traffic, are written into a second portion of the sequence number field. The sequence number counter is then incremented.

In another form, an apparatus is provided comprising a processor and a network interface unit coupled to the processor. The processor is configured to: for a security association, create a plurality of sequence number spaces that each correspond to a respective class of traffic, wherein each sequence number space is identified by a unique selector value; for each sequence number space, create a sequence number counter for counting a sequence of outbound packets of a class of traffic corresponding to the sequence number space; for an outbound packet of a particular class of traffic, write a selector value of a sequence number space of the particular class of traffic into a first portion of a sequence number field in a header of the outbound packet; write the low order bits of a current value of a sequence number counter, associated with the sequence number space of the particular class of traffic, into a second portion of the sequence number field; send the outbound packet to a receiving device, and increment the sequence number counter.

In another form, one or more non-transitory computer readable storage media are provided encoded with software comprising computer executable instructions. The instructions, when executed by one or more processors, cause the one or more processors to: for a security association, create a plurality of sequence number spaces that each correspond to a respective class of traffic, wherein each sequence number space is identified by a unique selector value; for each sequence number space, create a sequence number counter for counting a sequence of outbound packets of a class of traffic corresponding to the sequence number space; for an outbound packet of a particular class of traffic, write the low order bits of a selector value of a sequence number space of the particular class of traffic into a first portion of a sequence number field in a header of the outbound packet; write a current value of a sequence number counter, associated with the sequence number space of the particular class of traffic, into a second portion of the sequence number field; send the outbound packet to a receiving device, and increment the sequence number counter.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:
1. A method comprising:
   at a sending network device:
      for a security association, creating a plurality of sequence number spaces that each correspond to a respective class of traffic, wherein each sequence number space is identified by a unique selector value;
      for each sequence number space, creating a sequence number counter for counting a sequence of outbound packets of a class of traffic corresponding to the sequence number space;
      for an outbound packet of a particular class of traffic, writing a selector value of a sequence number space of the particular class of traffic into a first portion of a sequence number field in a header of the outbound packet;
      writing low-order bits of a current value of a sequence number counter, associated with the sequence number space of the particular class of traffic, into a second portion of the sequence number field;
      sending the outbound packet to a receiving device, and incrementing the sequence number counter.

2. The method of claim 1, wherein each class of traffic is a quality of service (QoS) service class.

3. The method of claim 1, wherein sending comprises:
sending the outbound packet using an IP Security (IPSec) protocol.

4. The method of claim 3, wherein the writing of the selector value and the writing of the low-order bits of the current value of the sequence number counter into the sequence number field comprise:
writing the selector value and the low-order bits of the current value into an encapsulating security payload (ESP) header.

5. The method of claim 3, wherein the writing of the selector value and the writing of the low-order bits of the current value of the sequence number counter into the sequence number field comprise:
writing the selector value and the low-order bits of the current value into an IP authentication header (AH).

6. The method of claim 1, wherein the writing of the selector value into the first portion of the sequence number field comprises writing the selector value into high order bits of the sequence number field.

7. The method of claim 1, wherein the writing of the low-order bits of the current value of the sequence number counter into the second portion of the sequence number field comprises writing the low-order bits of the current value of the sequence number counter into low order bits of the sequence number field.

8. An apparatus comprising:
a processor;
a network interface unit coupled to the processor;
wherein the processor is configured to:
for a security association, create a plurality of sequence number spaces that each correspond to a respective class of traffic, wherein each sequence number space is identified by a unique selector value;
for each sequence number space, create a sequence number counter for counting a sequence of outbound packets of a class of traffic corresponding to the sequence number space;
for an outbound packet of a particular class of traffic, write a selector value of a sequence number space of the particular class of traffic into a first portion of a sequence number field in a header of the outbound packet;
write low-order bits of a current value of a sequence number counter, associated with the sequence number space of the particular class of traffic, into a second portion of the sequence number field;
send the outbound packet to a receiving device, and increment the sequence number counter.

9. The apparatus of claim 8, wherein each class of traffic is a quality of service (QoS) service class.

10. The apparatus of claim 8, wherein the processor is configured to:
send the outbound packet using an IP Security (IPSec) protocol.

11. The apparatus of claim 10, wherein the processor is configured to:
write the selector value and the low-order bits of the current value into an encapsulating security payload (ESP) header.

12. The apparatus of claim 10, wherein the processor is configured to:
write the selector value and the low-order bits of the current value into an IP authentication header (AH).

13. The apparatus of claim 8, wherein the processor is configured to:
write the selector value into high order bits of the sequence number field.

14. The apparatus of claim 8, wherein the processor is configured to:
write the low-order bits of the current value of the sequence number counter into low order bits of the sequence number field.

15. One or more non-transitory computer readable storage media encoded with software comprising computer executable instructions that when executed by one or more processors, cause the one or more processors to:
for a security association, create a plurality of sequence number spaces that each correspond to a respective class of traffic, wherein each sequence number space is identified by a unique selector value;
for each sequence number space, create a sequence number counter for counting a sequence of outbound packets of a class of traffic corresponding to the sequence number space;
for an outbound packet of a particular class of traffic, write a selector value of a sequence number space of the particular class of traffic into a first portion of a sequence number field in a header of the outbound packet;
write low-order bits of a current value of a sequence number counter, associated with the sequence number space of the particular class of traffic, into a second portion of the sequence number field;
send the outbound packet to a receiving device, and increment the sequence number counter.

16. The non-transitory computer readable storage media of claim 15, wherein each class of traffic is a quality of service (QoS) service class.

17. The non-transitory computer readable storage media of claim 15, wherein the executable instructions that cause the one or more processors to send the outbound packet cause the one or more processors to send the outbound packet using an IP Security (IPSec) protocol.

18. The non-transitory computer readable storage media of claim 17, wherein the executable instructions that cause the one or more processors to write the selector value and to write the current value of the sequence number counter into the sequence number field, comprise instructions that cause the one or more processors to:
write the selector value and the low-order bits of the current value into one of an encapsulating security payload (ESP) header or an IP authentication header (AH).

19. The non-transitory computer readable storage media of claim 15, wherein the executable instructions that cause the one or more processors to the write the selector value comprise instructions that cause the one or more processors to write the selector value into high order bits of the sequence number field.

20. The non-transitory computer readable storage media of claim 15, wherein the executable instructions that cause the one or more processors to write the low-order bits of the current value of the sequence number counter comprise instructions that cause the one or more processors to write the current value of the sequence number counter into low order bits of the sequence number field.

* * * * *